United States Patent [19]
Nielinger et al.

[11] Patent Number: 4,937,276
[45] Date of Patent: Jun. 26, 1990

[54] GLASS-FIBER-REINFORCED STABILIZED POLYAMIDE MOLDING COMPOSITIONS

[75] Inventors: Werner Nielinger, Krefeld; Heinz-Josef Füllmann, Leichlingen; Jürgen Kirsch, Cologne; Ludwig Bottenbruch, Krefeld, all of Fed. Rep. of Germany

[73] Assignee: Bayer Aktiengesellschaft, Leverkusen, Fed. Rep. of Germany

[21] Appl. No.: 191,905

[22] Filed: May 9, 1988

[30] Foreign Application Priority Data

May 22, 1987 [DE] Fed. Rep. of Germany ....... 3717218

[51] Int. Cl.$^5$ .......................... C08K 5/50; C08K 5/524
[52] U.S. Cl. .................................... 524/136; 524/139; 524/607; 524/154
[58] Field of Search ................. 524/139, 136, 607, 154

[56] References Cited

U.S. PATENT DOCUMENTS

| | | | |
|---|---|---|---|
| 3,491,042 | 1/1970 | Hermann | 524/154 |
| 3,505,285 | 4/1970 | Hermann et al. | 524/154 |
| 3,553,161 | 1/1971 | Hermann et al. | 524/154 |
| 4,603,166 | 7/1986 | Poppe et al. | 524/607 |
| 4,673,728 | 6/1987 | Nielinger et al. | 528/339 |
| 4,762,910 | 8/1988 | Nielinger et al. | 528/335 |

FOREIGN PATENT DOCUMENTS 1245591  7/1967  Fed. Rep. of Germany.

Primary Examiner—Lewis T. Jacobs
Attorney, Agent, or Firm—Connolly and Hutz

[57] ABSTRACT

Improved polyamide molding compositions are characterized in that
(a) the polyamide essentially contains the polycondensation product of adipic acid, terephthalic acid and hexamethylenediamine,
(b) the molding compositions are reinforced with glass fibers and
(c) a mixture of copper-, halogen- and phosphorus-containing compounds is present as stabilizer.

9 Claims, No Drawings

GLASS-FIBER-REINFORCED STABILIZED POLYAMIDE MOLDING COMPOSITIONS

This invention relates to a stabilized glass-fiber-reinforced copolyamide of adipic acid, terephthalic acid and hexamethylenediamine which shows high resistance to the effect of chemicals at elevated temperatures.

Glass-fiber-reinforced polyamides are distinguished from unreinforced polyamides by a higher deflection temperature and by improved tensile strength, rigidity and hardness. However, the higher deflection temperature cannot always be fully utilized because the polyamide can be damaged at the high processing temperatures required for the glass-fiber-reinforced polaymides and where the moldings are used for prolonged periods at elevated temperature. For this reason, glass-fiber-reinforced products are frequently stabilized. The effect of chemicals can cause additional damage to the polyamides. A limit is thus imposed on the use of polyamides at elevated temperatures as a starting material for the production of such articles as pipes, tubes, storage tanks for hot liquids in industrial plants or for the production of radiator tanks for motor vehicles. It is not possible at the present time further to increase the temperature of the cooling fluid without damage to the cooling system. The proposals hitherto put forward for improving polyamides are unsatisfactory. Although, according to EP-A-0 129 974, the resistance of glass-fiber-reinforced polyamide-66, polyamide-6 or polyamide-610 to chemicals is increased somewhat by addition of olefin copolymers, the ability of these polyamides to withstand stressing for prolonged periods at elevated temperatures is not improved by this measure. DE-A-2 927 018 describes a glass-fiber-reinforced polyamide-66 in which part of the adipic acid is replaced by terephthalic acid. It is possible in this way to obtain improved flow behavior during extrusion and to eliminate the need for post-calibration. Although, according to this publication, the resistance of the copolyamides to chemicals and to temperature are favorable, there is no indication of an improvement in the deflection temperature of the polyamides under load. On the contrary, the lower melting point of the copolyamide by comparison with polyamide-66 rather suggests a reduction in the deflection temperature under load. Improved polyamides optionally reinforced with glass fibers are already known from DE-A-34 07 492.

The object of the present invention is to provide glass-fiber-reinforced polyamides which satisfy the increased requirements.

The present invention relates to stabilized polyamide molding compositions essentially containing the polycondensation product of adipic acid, terephthalic acid and hexamethylenediamine as polyamide, the molding compositions being reinforced with glass fibers and containing a mixture of copper-, halogen- and phosphorus-containing compounds as stabilizer.

Particularly preferred polyamides are the copolyamides known from DE-A-3 407 492.

Preferred copolyamides generally contain from 30 to 45% by weight and preferably from 37 to 42% by weight of units of polyhexamethylene terephthalamide and from 55 to 70% by weight and preferably from 58 to 63% by weight of units of polyhexamethylene adipamide according to DE-A-3 407 492.

The copolyamides according to the invention may contain additional polyamide-forming components preferably up to at most 15% by weight, more preferably up to 10% by weight. Isophthalic acid in particular may be used as an additional acid component while hexamethylene diamine in particular may be used as an additional diamine component. Other diamines are the trimethyl hexamethylene diamines or the 4,4-diaminodicyclohexylmethanes.

Preferred copolyamides of this type consist of at least 30% by weight, preferably 30 to 51.5% per weight of units of hexamethylene adipamide, 48.5 to 60% by weight and preferably 48.5 to 55% by weight of units of hexamethylene terephthalamide and up to 10.0% by weight and preferably up to 15.0% by weight of units of hexamethylene isophthalamide. They are described in DE-A 3 506 656.

The polyamides generally contain from 10 to 40% by weight and preferably from 15 to 35% by weight of fibers of standard commercially obtainable, sized, alkali-free glass. They have a diameter of generally from 8 to 15 $\mu$m and, in general, a maximum fiber length distribution of 20 to 600 $\mu$m and preferably 40 to 350 $\mu$m.

Suitable stabilizers are preferably phosphines and/or phosphites and copper compounds, preferably in combination with alkali halogenides. Preferred stabilizers are the combinations of copper-containing compounds with alkali halides and phosphorus compounds known from DE-A-1 245 591. Suitable copper-containing compounds are, in particular, copper(I) halides, such as copper iodide and copper bromide. Preferred alkali halides are, in particular, lithium, sodium and potassium bromides and the corresponding iodides. Preferred phosphorous compounds are triaryl- or tris(alkylaryl)-phosphines such as tri-n-butyl-phosphine or phenyl dimethyl phosphine, more especially triphenyl phosphine. Phosphites, as known in the state of the art as stabilizers, are also usable.

The stabilizer mixture is generally present in quantities of from 0.01 to 2.5% by weight, preferably in quantities of from 0.1 to 1.5% by weight and more preferably in quantities of from 0.1 to 1.0% by weight, based on the mixture.

UV absorbers or other stabilizers, for example phenolic antioxidants, (cyclo)aliphatic, sterically hindered amines or aromatic mono, di- or polyamines, may be additionally added in quantities of from 0.2 to 2.0% by weight and preferably in quantities of from 0.25 to 1.0% by weight.

Phenols, aromatic (poly)amines and, optionally, UV absorbers may be additionally added in quantities of from 0.2 to 2.0% by weight and preferably in quantities of from 0.25 to 1.0% by weight.

The mixtures are prepared in standard commercially available machines by directly processing a uniform mixture of the copolyamide, the glass fibers and the stabilizers, which may optionally be used in the form of a concentrate, to form moldings. However, it is of considerably greater advantage to mix the components in the melt, for example in a twin-screw extruder, and to process the resulting granulate into moldings.

The products according to the invention may contain the usual auxiliaries and additives, for example lubricants and mold release agents, nucleating agents, flame-proofing agents and other fillers. Suitable fillers are glass microbeads, chalk, quartz, such as novaculite, silicates, such as asbestos, feldspar, mica, talcum, wollastonite and also kaolin in calcined and non-calcined form. Other suitable additives include dyes and pigments, high-impact modifiers, for examle based on copolymers of ethylene or grafted rubber latices, for example on polybutadiene or poly(meth)acrylate. High-impact modifiers such as these are described, for example, in DE-A-2 622 973, EP-A-1245, EP-A-83 446.

The polyamides according to the invention may be processed without difficulty in standard commercially available machines. They may be processed into moldings for technical apparatus, for machine construction and the automotive industry, such as injection-molded parts, hollow bodies etc. which come into contact with hot chemicals, more especially radiator tanks.

EXAMPLE 1

68.4 parts by weight copolyamide of adipic acid, terephthalic acid and hexamethylenediamine, 30 parts by weight sized glass fibers of E-glass (Silenka 8041), 1.4 parts by weight of a stabilizer mixture of CuI,KI, triphenyl phosphine according to DE-A-1 245 591 in the form of a 10% concentrate in PA 66 and 0.2 part by weight of a mold release agent (ester wax of ethylene glycol with montanic acids) are compounded in a Werner & Pfleiderer Type ZSK 32 twin-screw extruder at a melt temperature of 304° C. and at a throughput of 10 kg/h.

The copolyamide contains 60% by weight of units of poly(hexamethylene adipamide) and 40% by weight of units of poly(hexamethylene terephthalamide). It was produced in accordance with DE-A-3 407 492. The relative viscosity of the copolyamide, as measured on a 1% solution in m-cresol at 25° C. in an Ubbelohde viscosimeter, is 3.1.

Test specimens produced from the reinforced polyamide are stored in a mixture of ethylene glycol and water (mixing ratio 1:1 parts by weight) in an autoclave at 120° C. Samples are taken after various times and are used to determine impact strength in accordance with DIN 53 453 and bending modulus in accordance with DIN 53 457. The results are shown in the Table.

EXAMPLE 2

As Example 1, but with 2.8 parts by weight of the stabilizer mixture.

EXAMPLE 3

As Example 1, but with 0.3 part by weight of the stabilizer mixture (no concentrate in polyamide).

EXAMPLE 4

As Example 1, but with storage at 130° C.

EXAMPLE 5

As Example 1, but with storage at 140° C.

COMPARISON EXAMPLE 1

As Example 1, but without any addition of stabilizer and with storage at 120° C.

The following Comparison Examples were carried out with polyamide-66 in accordance with Example 1. The relative viscosity of the polyamide-66 was 3.0 and the temperature of the melt during compounding 286° C.

COMPARISON EXAMPLE 2

Without any addition of stabilizer, storage at 120° C.

COMPARISON EXAMPLE 3

The stabilizer added was the same as in Example 3.

COMPARISON EXAMPLE 4

The stabilizer added was the same as in Example 1, storage at 130° C.

COMPARISON EXAMPLE 5

The stabilizer added was the same as in Example 1, storage at 140° C.

The time elapsing before cracks began to form is shown in the following:
Example 4: a few cracks after 35 days
Example 5: after 25 days
Comparison Example 2: after 16 days
Comparison Example 4: after 1 day
Comparison Example 5: after 1 day

TABLE

| Storage time (days) | | Fresh from injection molding | 2 | 10 | 21 | 26 | 35 | Storage at °C. |
|---|---|---|---|---|---|---|---|---|
| Example 1 | | | | | | | | |
| Impact strength | (kJ/m$^2$) | 37 | 73 | 59 | 49 | 46 | | 120 |
| E-modulus | (MPa) | 7725 | 3058 | 3090 | 3077 | 3030 | | |
| Example 2 | | | | | | | | |
| Impact strength | (kJ/m$^2$) | 42 | 77 | 66 | 54 | 51 | | 120 |
| E-modulus | (MPa) | 7916 | 2942 | 2977 | 3045 | 3062 | | |
| Example 3 | | | | | | | | |
| Impact strength | (kJ/m$^2$) | 44 | 77 | 63 | 56 | | 53 | 120 |
| E-modulus | (MPa) | 8129 | 3086 | 3188 | 3355 | | 3385 | |
| Comparison Example 1 | | | | | | | | |
| Impact strength | (kJ/m$^2$) | 31 | 86 | 55 | 39 | 30 | | 120 |
| E-modulus | (MPa) | 6413 | 1947 | 1908 | 2042 | 2158 | | |
| Comparison Example 2 | | | | | | | | |
| Impact strength | (kJ/m$^2$) | 47 | 68 | 57 | 46 | 44 | 33 | 120 |
| E-modulus | (MPa) | 8145 | 3325 | 3861 | 4250 | 4328 | 4254 | |
| Comparison Example 3 | | | | | | | | |
| Impact strength | (kJ/m$^2$) | 49 | 69 | 55 | 43 | 40 | | 120 |
| E-modulus | (MPa) | 8195 | 3929 | 3930 | 4161 | 4357 | | |
| Example 4 | | | | | | | | |
| Impact strength | (kJ/m$^2$) | 46 | 96 | 67 | 46 | | 31 | 130 |
| Comparison Example 4 | | | | | | | | |

TABLE-continued

| Storage time (days) | | Fresh from injection molding | 2 | 10 | 21 | 26 | 35 | Storage at °C. |
|---|---|---|---|---|---|---|---|---|
| Impact strength Example 5 | (kJ/m²) | 53 | 50 | 30 | 19 | | 12 | 130 |
| Impact strength Comparison Example 5 | (kJ/m²) | 51 | 71 | 32 | 15 | | | 140 |
| Impact strength | (Kj/m²) | 60 | 36 | 12 | 6 | | | 140 |

We claim:

1. Stabilized polyamide molding compositions, characterized in that
   (a) the polyamide essentially contains the polycondensation product of adipic acid, terephthalic acid and hexamethylenediamine,
   (b) the molding compositions are reinforced with glass fibers and
   (c) a mixture of copper-, halogen- and phosphorus-containing compounds is present as the stabilizer.

2. Polyamide molding compositions as claimed in claim 1, characterized in that the copolyamide contains from 30 to 45% by weight of units of polyhexamethylene terephthalamide.

3. Polyamide molding compositions as claimed in claim 1, characterized in that the copolyamide contains additionally up to 15% by weight, of polyamide forming components.

4. Polyamide molding compositions as claimed in claim 1, characterized in that the copolyamide contains at least 30% by weight hexamethylene adipate, 48.5–60% by weight hexamethylene terephthalic amide and up to 10% by weight of hexamethylene isophthalamide.

5. Polyamide molding compositions as claimed in claim 1, characterized in that they contain from 10 to 40 parts by weight of glass fibers.

6. Polyamide molding compositions, as claimed in claim 1, characterized in that the stabilizer (c) contains cuprous bromide or cuprous iodide and alkalihalogenides, selected from lithium, natrium or caliumbromides or iodides.

7. Polyamide molding compositions as claimed in claim 1, characterized in that a mixture of copper iodide, potassium iodide and triphenyl phosphine is used as stabilizer in a quantity of from 0.01 to 2.5% by weight.

8. Polyamide molding compositions as claimed in claim 1 which contain a stabilizing amount of a phosphine, a phosphite or mixtures of phosphines and phosphites.

9. Polyamide molding compositions as claimed in claim 8 wherein the phosphine is a triaryl phosphine, trialkylphosphine or a tris(alkyl aryl)-phosphine.

* * * * *